Feb. 18, 1958 R. B. RANSOM 2,823,559
DIFFERENTIAL GEAR SET
Filed May 7, 1956 2 Sheets-Sheet 1

INVENTOR:
Richard B. Ransom,
BY Jim Freeman & Molinare
ATTORNEYS.

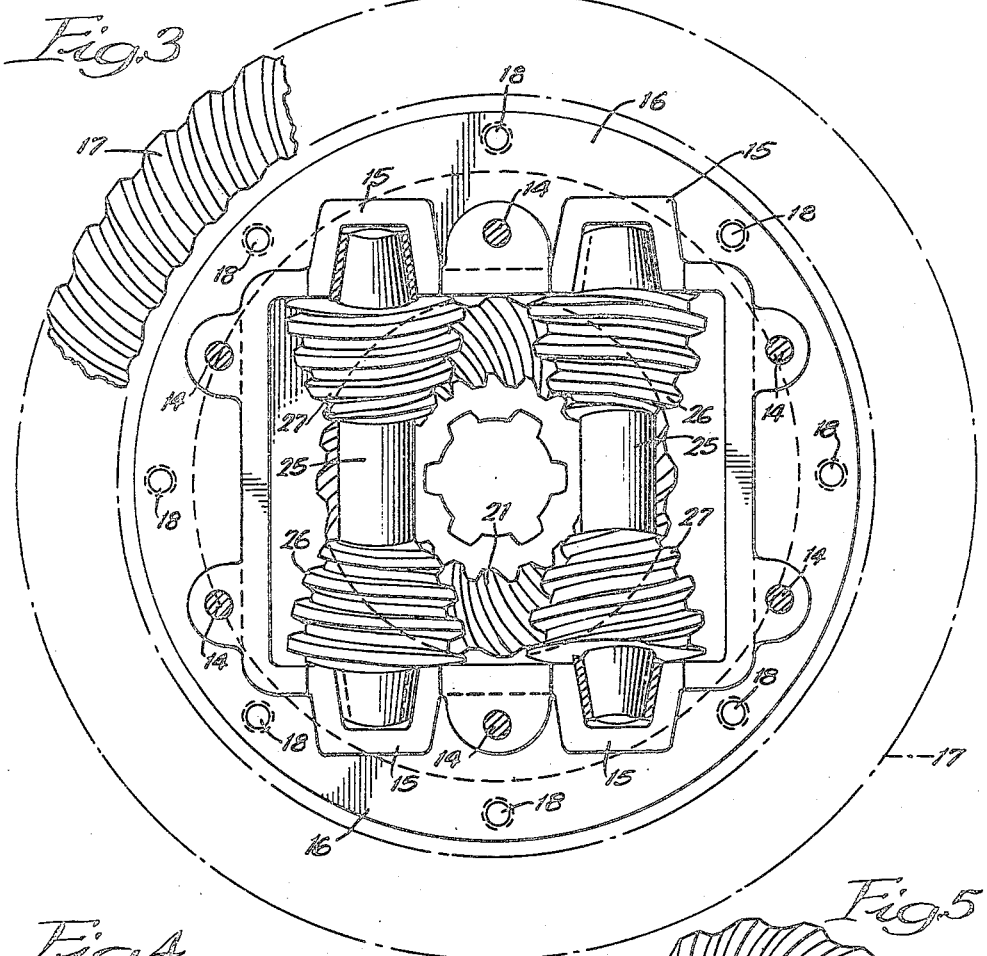

United States Patent Office 2,823,559
Patented Feb. 18, 1958

2,823,559

DIFFERENTIAL GEAR SET

Richard B. Ransom, South Bend, Ind.

Application May 7, 1956, Serial No. 583,257

7 Claims. (Cl. 74—715)

This invention relates to differential gear sets and more particularly to differential gearing of the type used in self-propelled vehicles to drive different wheels or axles.

One of the major problems in connection with wheels or similar driven units driven through a differential gear is loss of traction or load on one wheel or unit such as may occur when one only of a pair of wheels is on a slick surface. When this happens with a conventional differential the remaining wheel or driven unit cannot exert a force greater than that exerted by the slipping wheel or unit with the result that the vehicle or other load cannot be moved.

Various expedients have been attempted to overcome this difficulty but in general these have involved relatively complex and expensive constructions. Further the majority of the suggested expedients have required movable control elements such as clutches or brakes or shiftable gear elements which are apt to get out of order and prevent proper functioning of the units.

It is one of the objects of the present invention to provide a differential gear set which involves no moving parts over and above those required in a conventional differential gear set and which is as a result simple and inexpensive to manufacture and extremely reliable in operation.

Another object is to provide a differential gear set in which the side gears are driven through interconnected skewed pinions of opposite hand which mesh with the gears respectively.

According to one feature of the invention, the pinions are hypoid pinions formed on or rigidly secured to pinion shafts which extend between hypoid side gears spaced from their common axis and at an acute angle to the plane of the gears. The pinion shafts are preferably journaled in a cage with two pinion shafts lying on opposite sides of the common axis of the gears.

The above and other objects and features of the invention will be more readily apparent from the following description when read in connection with the accompanying drawings, in which:

Figure 3 is a transverse section substantially on the line 3—3 of Figure 1, and

Figures 4 and 5 are elevations of the left and right hand side gears respectively.

Figure 1:
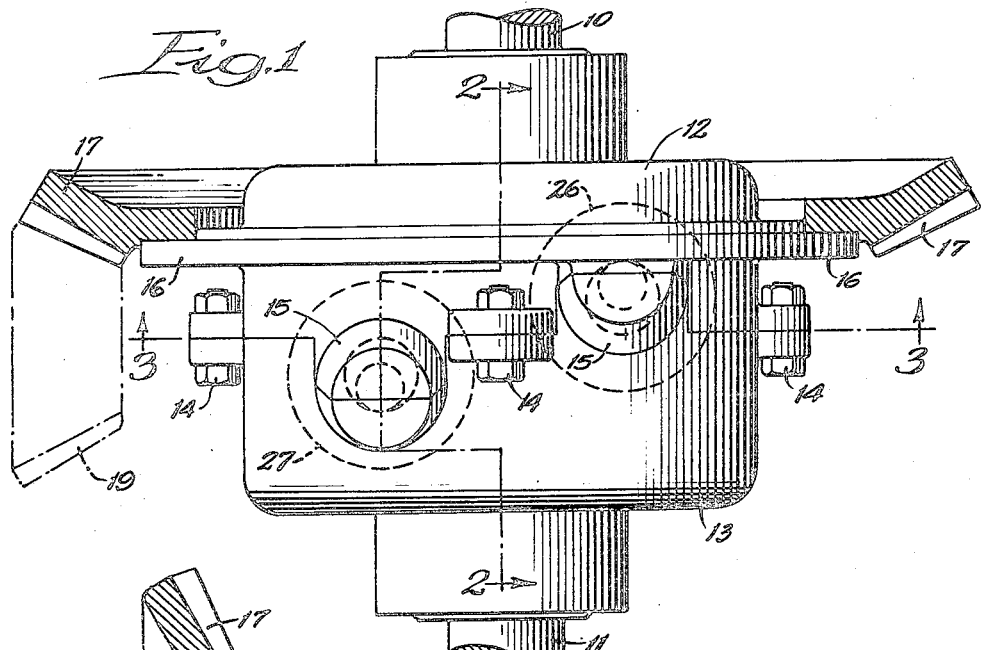
Figure 1 is a plan view of a differential gear set embodying the invention.

The differential, as shown, is of the type normally used in connection with divided rear axles on automotive vehicles, as shown at 10 and 11, to enable the axles to be driven at different speeds for negotiating curves and the like. The differential comprises a split housing including a first housing part 12 rotatably mounted on an enlarged hub portion on the axle 10 and a housing part 13 rotatably mounted on an enlarged hub on the axle 11. The housing parts are adapted to be secured together by bolts 14, or the like, extending through radially projecting flanges on the housing parts. The housing parts are further formed with projecting bosses 15 to provide journals for the pinion shafts, to be described later, the bosses being offset in opposite directions from the center line of the housing and best seen in Figures 1 and 2.

The housing is adapted to be driven and to transmit torque differentially to the axles 10 and 11. For this purpose, the housing part 12 is formed with an annular radially extending flange 16 to which a bevel gear 17 may be secured by screws 18 or similar fastenings. The bevel gear may mesh with a bevel drive pinion 19 indicated in Figure 1 which may be driven by the propeller shaft. It will be understood that the gear 17 and pinion 19 may be straight bevel gearing or may be hypoid or worm gearing, as desired, and as is known in the art.

Figure 2:
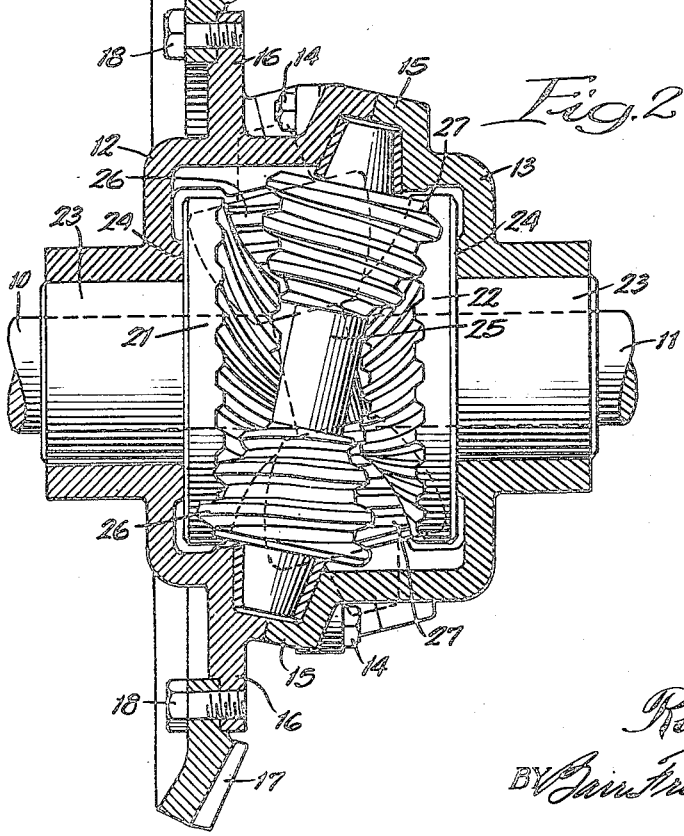
Figure 2 is an axial section substantially on the line 2—2 of Figure 1.

The differential gear set of the present invention comprises a pair of side gears 21 and 22 having facing toothed surfaces and which, as shown, are hypoid gears of opposite hand, the gear 21 as shown in Figure 2 being a right-hand gear and the gear 22 being a left-hand gear. The gears 21 and 22 are formed with outwardly extending hubs 23 through which the shafts 10 and 11, respectively, extend and on which the housing parts 12 and 13 are rotatably supported. The outer faces of the gears 21 and 22 may be flat and may bear on annular supporting surfaces 24 in the housing parts to hold the gears against axial separation in the housing.

To drive the gears 21 and 22, one or more pinion shafts 25 are rotatably supported in the housing by having their ends journaled in the bosses 15, as shown in Figures 2 and 3. In the preferred construction, two pinion shafts 25 are employed lying in planes parallel to and spaced on opposite sides of the common axis of the axles 10 and 11 distances less than the maximum radius of the toothed surfaces, as best seen in Figure 3, and extending between the side gears at opposite acute angles to a plane transverse to the axis of the axles. Each shaft is integrally formed on its opposite end portions, or may have rigidly attached to its opposite end portions, pinions 26 and 27 which are respectively of right and left hand. Due to the skewing or angle of the pinion shafts relative to a plane normal to the axles, the right-hand pinion 26 on each pinion shaft will mesh only with the right-hand side gear 21 and the left-hand pinion 27 on each shaft will mesh only with the left-hand side gear 22. The pinions may be skewed bevel pinions to mesh with corresponding side gears but are preferably hypoid pinions as shown for greater strength.

One of the advantages of the hypoid arrangement, as described above, is that the skewing or inclination of the pinions has the effect of considerably shortening the radial distance spanned by the two pinions outward from the axis of revolution of the differential so that the assembly may be made substantially more compact. Furthermore, inclination of the pinions requires that the side gears be flattened out more than in conventional hypoid gear arrangements so that the inner ends of the spiral side gear teeth are more nearly the same radius as the outer end than the teeth of a conventional hypoid assembly. A particular advantage results from the fact that the gear teeth of both the side gears and the pinion gears are more nearly of the same size throughout their length so that the teeth are stronger and are easier to cut than those of a conventional assembly of the same size.

With the hypoid arrangement, as shown, the angle of the teeth can be so designed as to produce easily substantially any desired mechanical advantage so that a wide variation in locking effect can be obtained. For a conventional automobile differential I have determined that a mechanical advantage on the order of 10° approximately as shown in the drawing is desirable. With a mechanical advantage on this order and with friction losses from one side of the differential to the other of from around 5% to 6% of the power transmitted from one axle to the other, it will be seen that the friction of one wheel against glare ice, which is normally rated at about 5% of the friction of a wheel not spinning against dry asphalt will produce a reaction through the differential of about 40% to 50% of the torque applied. Under these conditions, with one wheel on ice and one on dry asphalt slow differential will still occur but the non-slipping wheel would receive a torque of 160% to 180% of the normal torque to one wheel. The slipping wheel would absorb the remainder of the torque so that even though one wheel of the vehicle is on glare ice the vehicle can still be driven through the other wheel with 80% to 90% of the normal available driving torque. In making normal turns differentiation will take place in substantially the usual manner except that a slightly larger torque than normal will be transmitted to the inner wheel. This, however, will not interfere with normal operation on dry pavements or operation in which both wheels are encountering the same type of surfaces.

It will be seen that by the present invention a differential can be provided whose cost of production is little, if any, greater than the cost of a standard spur gear differential and which might even be less because of the possibility of reducing the size for a given load design. The differential of the present invention involves no moving parts other than the gears themselves so that there are no parts to wear or get out of order and any desired degree of locking effect can still be obtained by design.

While one embodiment of the invention has been shown and described herein, it will be understood that it is illustrative only and not to be taken as a definition of the scope of the invention, reference being had for this purpose to the appended claims.

What is claimed is:

1. A different gear set comprising a pair of side gears mounted in spaced coaxial relation and having facing toothed surfaces, a pair of pinions whose axes lie in planes parallel to the axis of the side gears and spaced therefrom a distance less than the maximum radius of the toothed surfaces, each of the pinions meshing with one of the side gears only and the two pinions meshing with different side gears, and means drivably connecting the pinions for simultaneous rotation.

2. A differential gear set comprising a pair of side gears mounted in spaced coaxial relation, a pinion shaft spaced from the axis of the gears and lying at an acute angle to a plane perpendicular to the axis of the gears, and pinions of opposite hand on the opposite ends of the shaft meshing with the gears respectively.

3. A differential gear set comprising a pair of hypoid gears of opposite hand mounted in spaced coaxial relation, a pinion shaft spaced from the axis of the gears and lying at an acute angle to a plane perpendicular to the axis of the gears, and hypoid pinions on the opposite ends of the shaft meshing with the gears respectively.

4. A differential gear set comprising a pair of coaxial shafts, a pair of hypoid gears secured to the shafts respectively and lying in spaced relation, a cage rotatably mounted coaxially with the shafts, a pinion shaft journaled in the cage and extending between the gears spaced from the axis of the shafts and at an acute angle to a plane perpendicular to the axis of the gears, and a pair of spaced hypoid pinions of opposite hand on the shaft meshing with the gears respectively.

5. A differential gear set comprising a pair of coaxial shafts, a pair of hypoid gears secured to the shafts respectively and lying in spaced relation, a cage rotatably mounted coaxially with the shafts, a pair of pinion shafts journaled in the cage and extending between the gears on opposite sides of the axis of the shafts and at opposite acute angles to a plane perpendicular to the axis of the gears, and a pair of hypoid pinions on each of the shafts meshing with the gears respectively.

6. A differential gear set comprising a pair of side gears mounted in spaced coaxial relation and having facing generally conical toothed surfaces, a pair of generally conical pinions whose axes lie in planes parallel to the axis of the side gears and spaced therefrom a distance less than the maximum radius of the toothed surfaces, each of the pinions meshing with one of the side gears only and the two pinions meshing with different side gears, and means drivably connecting the pinions for simultaneous rotation.

7. A differential gear set comprising a pair of side gears mounted in spaced coaxial relation and having facing generally conical toothed surfaces, a pair of generally conical pinions whose axes lie in planes parallel to the axis of the side gears and spaced therefrom a distance less than the maximum radius of the toothed surfaces and at acute angles to a plane perpendicular to the axis of the side gears, said pinions each meshing with the toothed surface of one of the side gears only and the two pinions meshing with different side gears, and means drivably connecting the pinions for simultaneous rotation.

References Cited in the file of this patent

UNITED STATES PATENTS

| | | |
|---|---|---|
| 1,248,687 | Logue | Dec. 4, 1917 |
| 2,462,000 | Randall | Feb. 15, 1949 |
| 2,628,508 | Gleasman | Feb. 17, 1953 |

FOREIGN PATENTS

| | | |
|---|---|---|
| 700,661 | Germany | Dec. 27, 1940 |